I. B. LITZENBERGER.
POULTRY FEEDER.
APPLICATION FILED SEPT. 4, 1912.

1,088,597.

Patented Feb. 24, 1914.
2 SHEETS—SHEET 1.

Witnesses
Carroll Bailey.

Inventor
Isaac B. Litzenberger,
By Victor J. Evans
Attorney

I. B. LITZENBERGER.
POULTRY FEEDER.
APPLICATION FILED SEPT. 4, 1912.

1,088,597.

Patented Feb. 24, 1914.
2 SHEETS—SHEET 2.

Inventor
Isaac B. Litzenberger,
By Victor J. Evans
Attorney

Witnesses
Carroll Bailey
J. W. Garner

United States Patent Office.

ISAAC B. LITZENBERGER, OF FRANKFORT, INDIANA.

POULTRY-FEEDER.

1,088,597.

Specification of Letters Patent. Patented Feb. 24, 1914.

Application filed September 4, 1912. Serial No. 718,518.

*To all whom it may concern:*

Be it known that I, ISAAC B. LITZENBERGER, a citizen of the United States, residing at Frankfort, in the county of Clinton and State of Indiana, have invented new and useful Improvements in Poultry-Feeders, of which the following is a specification.

This invention is an improved poultry feeder and exerciser, the object of the invention being to provide an improved device of this kind which may be operated by poultry, especially chickens, to cause the device to scatter feed to the chickens or poultry, and thus require the chickens to take exercise while feeding, and to also prevent the feed from being wasted and from being injured by rain or by rats or mice, the invention consisting in the construction, combination and arrangement of devices hereinafter described and claimed.

Figure 1:
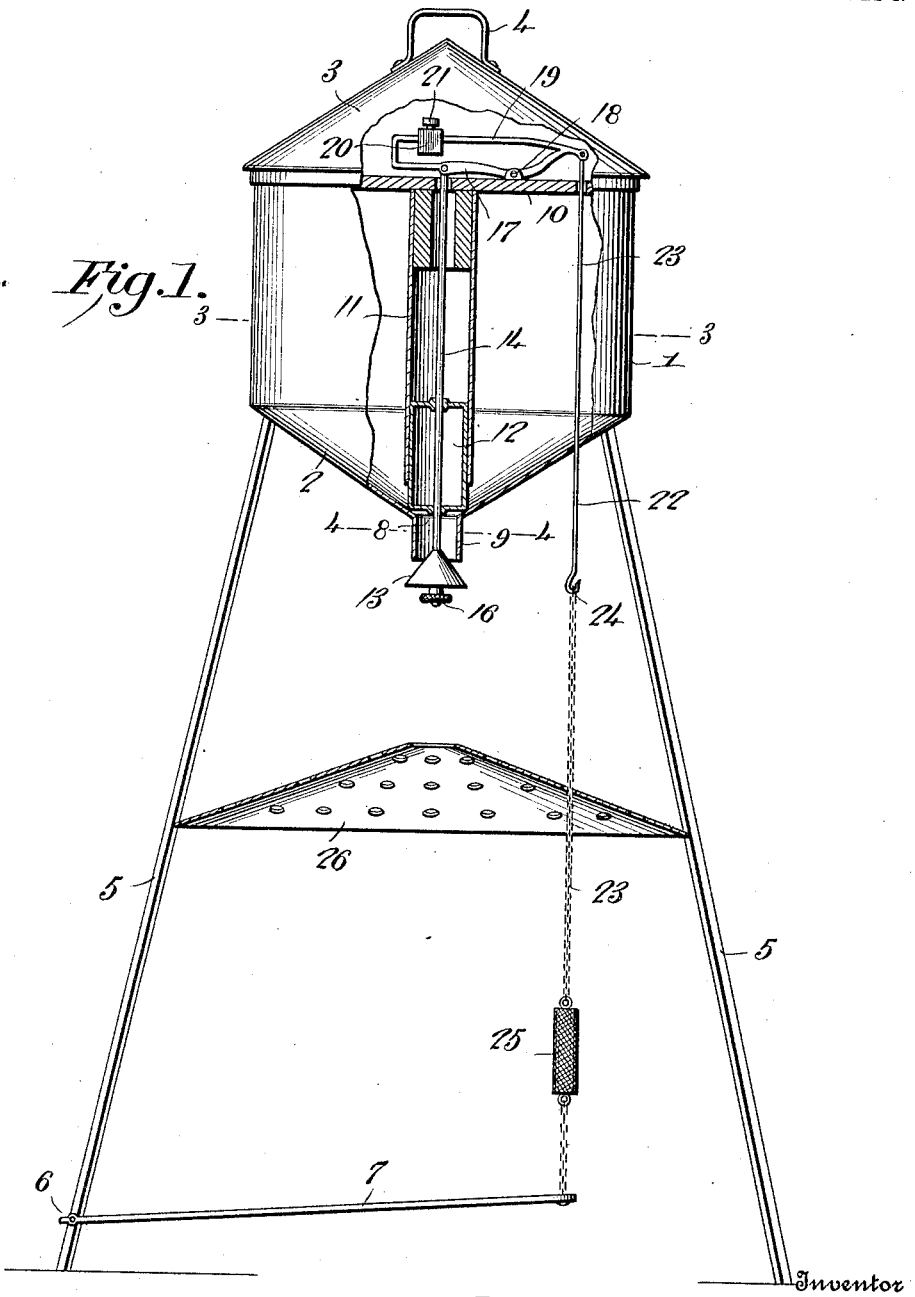
Figure 2:
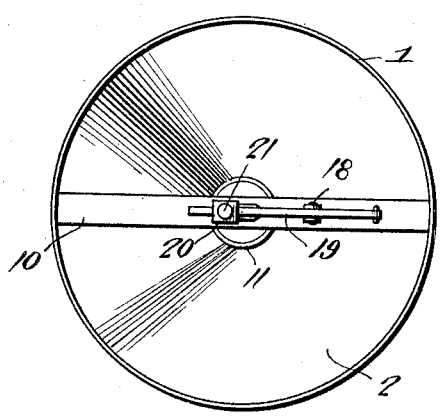
Figure 3:
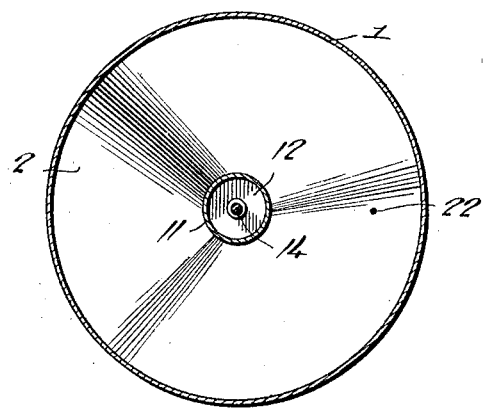
Figure 4:
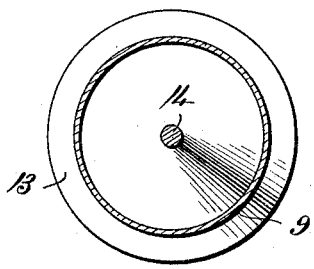
Figure 5:
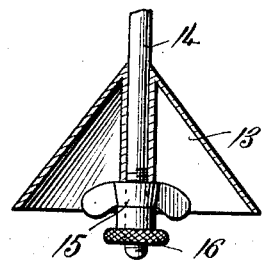

In the accompanying drawings: Figure 1 is partly an elevation and partly a sectional view of a poultry feeding and exercising mechanism constructed in accordance with my invention. Figs. 2 and 3 are detail views. Fig. 4 is a detail sectional view on the plane indicated by the line 4—4 of Fig. 1. Fig. 5 is a detail vertical sectional view of the discharge valve.

In the embodiment of my invention, I provide a reservoir or hopper 1 which is here shown as cylindrical in form with an inverted conical bottom 2 and a removable conical cover 3, the cover being provided with a handle 4. The hopper is provided with supporting legs 5, any suitable number of which may be employed and two of these legs are connected together by a rod 6 on which is pivoted the outer end of a treadle 7. In the center of the bottom of the hopper, at its lowest point, is a discharge opening 8, and a depending discharge spout 9.

A cross bar 10 is arranged across the center of the hopper at the upper end thereof and from the center of this cross bar depends a tubular guide 11, the lower end of which is spaced a suitable distance above the bottom of the hopper. A cut off valve 12 is arranged to move vertically in the lower portion of the tubular guide 11 and a discharge valve 13, which is here shown as conical in form, is arranged to operate at the lower end of the spout 9. These valves are secured on a rod 14 and the valve 13 is vertically adjustable on the said rod toward and from the lower end of the valve 12 and may be held at any desired adjustment by means of a winged adjusting nut 15 and a jam nut 16. The valves are so spaced apart that when the valve 12 closes the upper end of the discharge spout 9, the valve 13 opens the lower end of said spout. The rod 14 passes up through a central opening in the bar 10 and is connected to a lever 17, the fulcrum of which is indicated at 18. On the upper side of the lever 17 and substantially parallel therewith and spaced above the same is an adjusting arm 19 on which a counterbalancing weight 20 is slidably fitted, the weight being provided with a set screw 21 by means of which it may be secured at any desired adjustment on the arm 19. An operating rod 22 connects the lever 19 and the treadle 7 and passes through openings in the bar 10 and the bottom of the hopper. This operating rod is here shown as comprising a suitable number of sections 23 which are detachably connected together as by means of hooks 24. The operating rod also includes a bait element 25 which is here shown as a foraminous cylindrical vessel which is adapted to hold grain or any other feed. A conical deflector 26 is arranged between the supporting legs 5 and attached thereto and is provided with openings through one of which the operating rod 22 passes.

The operation of my device is as follows: Normally the valve 12 by the weight, is closed against the upper end of the spout 9 and the valve 13 is lowered therefrom so as to open the lower end of the said valve, and the treadle 7 is raised. A suitable quantity of grain or other feed is placed in the reservoir 1 and some is placed in the bait vessel 25. A bait feed attracts the chickens or other fowl and in an effort to obtain it, at least one of the fowls will step on the treadle 7 and thus depress it by its own weight. This movement of the treadle causes the rod 22 to draw downwardly on the outer end of the lever 17 and said lever is caused to raise the rod 14 and, hence, also the valves 12—13. The upward movement of the valve 12 opens the upper end of the spout 9 and the corresponding movement of the valve 13 closes the lower end of said spout but not until after a quantity of the feed has been discharged from the hopper through the spout onto the deflector. Owing to its shape, the deflector distributes the feed around and about the device so that the chickens scatter in their effort to get at the feed and are, hence, exercised. As soon as the feed is thus dropped, the chicken which was on the treadle 7 steps from the treadle and joins the others in the effort to get some of the discharged feed and, hence, the valve 12 reassumes its closed position and the valve 13 reassumes its open position. When the feed that has been distributed on the ground is consumed, the bait vessel is again resorted to by at least one of the fowls and the operation of the device is repeated, so that the feeder and exerciser is operated by the chickens themselves and is caused to deliver the feed to them intermittently.

It will be understood that owing to the construction of the reservoir 1 and its detachable cover 3, feed or grain placed therein is safely protected from the elements and from rats and mice. The slidable counterbalancing weight 20 enables the device to be adjusted so that the valves may be operated by the application of any desired degree of force or by the weight of a chicken or other fowl of any size. Hence, the machine may be operated by large or small fowls and is adapted to be used for feeding fowls of all ages and sizes. The tubular guide 11 in which the valve 12 operates keeps the feed in the hopper from pressing against the valve excepting that portion of the latter below the tubular guide and, hence, the said valve is protected from friction and pressure of the feed and is enabled to be moved by the application of very little power. Moreover, the lever 17 to which the valve rod is connected also contributes to the ready working of the valves and prevents the valve rod from sticking.

While I have herein shown and described a preferred form of my invention, I would have it understood that changes may be made in the form, proportion and construction of the several parts without departing from the spirit of the invention and within the scope of the appended claims.

I claim:—

1. A poultry feeder comprising a support, a hopper on the support and provided with a centrally arranged spout in its bottom, a cross bar arranged in the upper portion of the hopper, a tubular guide carried by the cross bar and depending from the lower side thereof, a cut off valve arranged to move vertically in the lower portion of the guide, a discharge valve arranged to operate at the lower end of the spout a rod connecting the cut off valve and discharge valve and extending upwardly through the tubular guide, a lever carried by and pivotally mounted on the cross bar and connected to said rod, said lever having an arm and an adjusting weight movably mounted on said arm, and means to operate the lever, and cause the latter to actuate the valves.

2. A device of the class described comprising a reservoir or hopper having a centrally arranged spout depending from its bottom and a fixed tubular guide secured in the hopper and arranged with its lower open end above the said spout, in combination with a valve arranged for operation in and housed by the tubular guide, a discharge valve arranged to operate at the lower end of the spout, a rod connecting the said valves and extending up through the tubular guide, the said discharge valve being of greater diameter than the spout of the hopper and being detachable from the said rod, a lever mounted in the hopper and to which the rod is connected and means to operate the lever and cause the latter to move the rod and valves.

ISAAC B. LITZENBERGER.

Witnesses:
 CORA HUFFMAN,
 LOTTIE CURTS.

Copies of this patent may be obtained for five cents each, by addressing the "Commissioner of Patents, Washington, D. C."